(12) United States Patent
Folkstedt et al.

(10) Patent No.: US 9,107,156 B2
(45) Date of Patent: Aug. 11, 2015

(54) OPTIMIZED DELAY

(75) Inventors: Bjorn Folkstedt, Molndal (SE); Par Ankel, Nodinge (SE); Jan Lindskog, Pixbo (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 326 days.

(21) Appl. No.: 13/516,866

(22) PCT Filed: Dec. 15, 2010

(86) PCT No.: PCT/EP2010/069797
§ 371 (c)(1),
(2), (4) Date: Jun. 18, 2012

(87) PCT Pub. No.: WO2011/073275
PCT Pub. Date: Jun. 23, 2011

(65) Prior Publication Data
US 2012/0275382 A1    Nov. 1, 2012

(30) Foreign Application Priority Data
Dec. 16, 2009  (WO) ................. PCT/EP2009/067339

(51) Int. Cl.
*H04W 56/00* (2009.01)
*H04L 1/18* (2006.01)

(52) U.S. Cl.
CPC ......... *H04W 56/0005* (2013.01); *H04L 1/1854* (2013.01); *H04L 1/1887* (2013.01)

(58) Field of Classification Search
CPC   H04W 56/0005; H04L 1/1854; H04L 1/1887
USPC ........... 370/310.2, 328, 330, 331; 455/422.1, 455/424, 442
See application file for complete search history.

(56) References Cited

U.S. PATENT DOCUMENTS

2002/0098839 A1 *   7/2002   Ogino et al. ................. 455/424
2005/0190702 A1 *   9/2005   Yamamoto et al. ........... 370/252

(Continued)

FOREIGN PATENT DOCUMENTS

| CN | 101185297 A | 5/2008 |
|---|---|---|
| CN | 101400050 A | 4/2009 |

OTHER PUBLICATIONS

3GPP, "3rd Generation Partnership Project; Technical Specification Group Radio Access Network; FDD Enhanced Uplink; Overall Description; Stage 2 (Release 6)", 3GPP TS 25.309 V6.6.0, Mar. 2006, 34 pages.

(Continued)

*Primary Examiner* — Paul H Masur
*Assistant Examiner* — Kabir Jahangir
(74) *Attorney, Agent, or Firm* — Rothwell, Figg, Ernst & Manbeck, P.C.

(57) ABSTRACT

A method for adjusting a timing offset value (CO) for a receiver (Node-B) is provided, the receiver being adapted to controlling and receiving reverse radio Sink transmissions from a transmitter (UE) according to predetermined response time requirements. The method comprising the steps of—estimating (11) at least one time budget map (TBM—116, 116') according to which the available processing time in the receiver is given as a function of the possible timing off-set value (CO); —determining (15) a given timing offset value (CO—106) for the radio fink (RL) of the transmitter in accordance with the estimated time budget map (TBM), such as to provide an optimized offset (CO) value for the base station; —assigning (17) the determined timing offset value (CO) to the radio link.

21 Claims, 7 Drawing Sheets

(56) References Cited

U.S. PATENT DOCUMENTS

| | | | |
|---|---|---|---|
| 2005/0239471 A1* | 10/2005 | Babovic | 455/452.2 |
| 2009/0111470 A1* | 4/2009 | Thakare | 455/436 |
| 2009/0122763 A1* | 5/2009 | Oguchi | 370/331 |
| 2009/0201865 A1* | 8/2009 | Uemura et al. | 370/329 |
| 2009/0238201 A1* | 9/2009 | Myers | 370/442 |
| 2011/0085491 A1* | 4/2011 | Tynderfeldt et al. | 370/315 |
| 2011/0158116 A1* | 6/2011 | Tenny et al. | 370/252 |

OTHER PUBLICATIONS

3GPP, "3rd Generation Partnership Project; Technical Specification Group Radio Access Network; Synchronization in UTRAN Stage 2 (Release 7)", 3GPP TS 25.402 V7.6.0, Sep. 2008, 51 pages.

3GPP, "3rd Generation Partnership Project; Technical Specification Group Radio Access Network; Physical channels and mapping of transport channels onto physical channels (FDD) (Release 7)", 3GPP TS 25.211 V7.7.0, Mar. 2009, 54 pages.

Parkvall, et al, WCDMA Enhanced Uplink-Technical Description (Rel 6), Ericsson Internal Report, No. EAB-04:013098 Uen, Revision C, Dec. 12, 2005, 45 pages.

Ericsson, "E-DCH Downlink Timing Relations", TSG-RAN WG1 #40, R1-050105, Feb. 14-18, 2005, 4 pages.

Lucent Technologies, "E-DCH Timing", 3GPP TSG-RAN WG1 #40, R1-050078, Feb. 14-18, 2005, 4 pages.

Office Action dated Aug. 1, 2014, issued in Chinese Patent Application No. 201080057102.7, 9 pages.

* cited by examiner

OPTIMIZED DELAY

CROSS REFERENCE TO RELATED APPLICATION(S)

This application is a 35 U.S.C. §371 National Phase Entry Application from PCT/EP2010/069797, filed Dec. 15, 2010, designating the United States, and also claims priority to International Application PCT/EP2009/067339, filed Dec. 16, 2009, the disclosures of which are incorporated by reference herein in their entirety.

TECHNICAL FIELD

This invention is directed to optimizing timing properties for a communication scheme, such as scheduling aspects relating to time division duplex (TDD), TDMA (Time Division Multiplex Access), WCDMA (Wideband Code Division Multiplex Access) or OFDMA (Orthogonal Frequency Division Multiplex Access)) systems. The invention relates generally to communication systems in which a receiver is controlling the timing of reverse link transmissions to the receiver from a transmitter and wherein predefined transmission timing time slots or opportunities must or should be observed. More particularly, the invention relates to managing and allocating timing properties for uplink communication to a base station to individual user entities.

BACKGROUND

According to the 3rd Generation Partnership Project (3GPP) a third generation (3G) mobile phone system, Wideband Code Division Multiple Access (WCDMA), is standardized within the International Telecommunication Union (ITU). WCDMA is based on three main units, the Radio Network Controller (RNC), the Node B and the User Equipment (UE). The communication between the Node B and the UE is based on a common timing scheme between the two units. This timing scheme is defined with a timing offset from the main time (reference) in the Node B. The value of this offset is called the chip offset and is defined individually for each UE, The chip offset is a value between 0 and 38 144 chips rounded to the closest 256 chip border. 38 400 chips correspond to 10 ms. Rounding off to the closest 256 chip border is performed to keep the downlink channels orthogonal.

The Enhanced Uplink features in WCDMA is one example of a communication system in which the base station is controlling, via a downlink control channel, the timing of reverse link transmissions to the base station from at least one user entity and wherein predefined transmission timing slots or opportunities must be observed for the user entity and also on the downlink control channel to the user entity. For WCDMA, Node B schedules uplink transmissions from users via a downlink control channel. The uplink transmission must adhere to a discrete timing scheme in order to operate in compliance with the HARQ process mentioned above on the up-link. In WCMDA, Node B schedules uplink transmissions such that HARQ process downlink control signalling is carried out in a timely manner.

When a UE is connected to the network, the RNC is responsible for choosing and as signing a chip offset for the UE. Choosing different chip offsets for different UE's will spread the processing load in the Node B over time, so that load peaks can be avoided. When a UE is connected to additional Node Bs, the UE will inherit the timing from the connections it previously has made. The standard supports a reconfiguration of the chip offset, but only for one step. i.e. +−256 chips, which corresponds to steps of 0.0667 ms.

It is noted that e.g. a cell range of 150 km gives a round trip time of around 1 ms. Hence, in practical cell applications the maximum chip offset can easily accommodate the variations in UE locations.

In release 6 of the WCDMA a specification, the standard was extended to include the set of features denoted the Enhanced Uplink (EUL) that increase the uplink speed and reduce the delays in the uplink. EUL is based on an uplink transport channel, the Enhanced Dedicated Channel (E-DCH).

The E-DCH uses soft combining and Hybrid Automatic Repeat Request (HARQ) process which implies that the Node B is transmitting Acknowledgements (ACK) and Negative Acknowledgements (NACK) back to the UE to indicate to the UE if it's transmission on the E-DCH was successful or not. If the UE does not receive an ACK it has to retransmit the data. The standard defines exactly when relative to the original transmission, the ACK or NACK shall be transmitted and when the UE shall retransmit its data, since the HARQ handling and the processing of a HARQ process must be ready within a certain time. Consequently, there is an implicit processing maximum delay requirement for the Node B and the UE.

There is a demand for higher throughput in e.g. WCDMA systems. Higher throughput gives the operator of the network the possibility to serve more users and hence render the system more profitable. In order to achieve a higher throughput, more advanced receivers are introduced in the base station. These advanced receivers use technologies like for instance Interference Cancellation (IC), Multi-User Detection (MUD) and Generalized Rake Receiver (GRAKE), all complex units that require extra processing power in the base station for the uplink. Processing capacity is expensive and it is a problem to fit in all the new technologies. This together with the maximum processing delay requirements in 3GPP constitutes a tough requirement on the Node B that can be hard to fulfil.

SUMMARY

It is a first object of the invention to set forth a method for utilizing computational resources in a receiver or a base station more effectively.

This object has been achieved by the subject matter according to claim 1, according to which there is provided A method for adjusting a timing offset value for a receiver, the receiver being adapted to controlling and receiving reverse radio link transmissions from a transmitter according to predetermined response time requirements. The method comprising the steps of estimating at least one time budget map according to which the available processing time in the receiver is given as a function of the possible timing offset value;

determining a given offset value for the radio link of the transmitter in accordance with the estimated time budget map, such as to provide an optimized offset value for the base station;

assigning the determined timing offset value to the radio link.

According to a further aspect of the invention there is provided a method for adjusting a timing offset value for a radio link of a base station, the base station being adapted to receive uplink transmissions from a user entity, UE, on the radio link according to predetermined response time requirements. The method comprises the steps of estimating at least one base station time budget map, according to which the available processing time in the base station is given as a function of the possible timing offset value;

determining a given offset value for the radio link of the user entity in accordance with the estimated time budget map, such as to provide an optimized offset value for the base station;

assigning the determined timing offset value to the radio link.

According to a first aspect of the invention, the offset value—in some applications also denoted as the chip offset—is used actively to take control of the timing budget in the Node. This can give the base station more available processing time without introducing more system delay or any other drawbacks on the network or in the user entity. This allows the Node B to use more advanced receivers that are needed to be able support more UEs and higher bit rates. It will also make it easier to be able to support time aligned transmissions in the uplink. The demand for more processing capacity in the Node B will also be lowered.

There is moreover provided a radio network control apparatus being adapted for adjusting a timing offset value for a radio link of a base station, the base station being adapted to receive uplink transmissions from a user entity on the radio link according to predetermined response time requirements.

The radio network control apparatus, comprises a time budget map, being adapted for estimating at least one base station time budget map according to which the available processing time in the base station is given as a function of the possible timing offset value;

determining a given offset value for the radio link of the user entity in accordance with the estimated time budget map, such as to provide an optimized offset value for the base station;

assigning the determined timing offset value to the radio link.

Further advantages of the invention will appear from the following detailed description of the invention.

DETAILED DESCRIPTION

As will be understood from the above description of the prior art, in order to obtain synchronisation, the base station imposes a timing regime to which all user entities of the cell must adhere.

As regards enhanced uplink, EUL, there apply specific timing requirements for the E-DCH channel for the user entity, E-DCH at UE (E-DCH@UE) and the E-DCH channel at Node B (E-DCH@NodeB).

Figure 2:
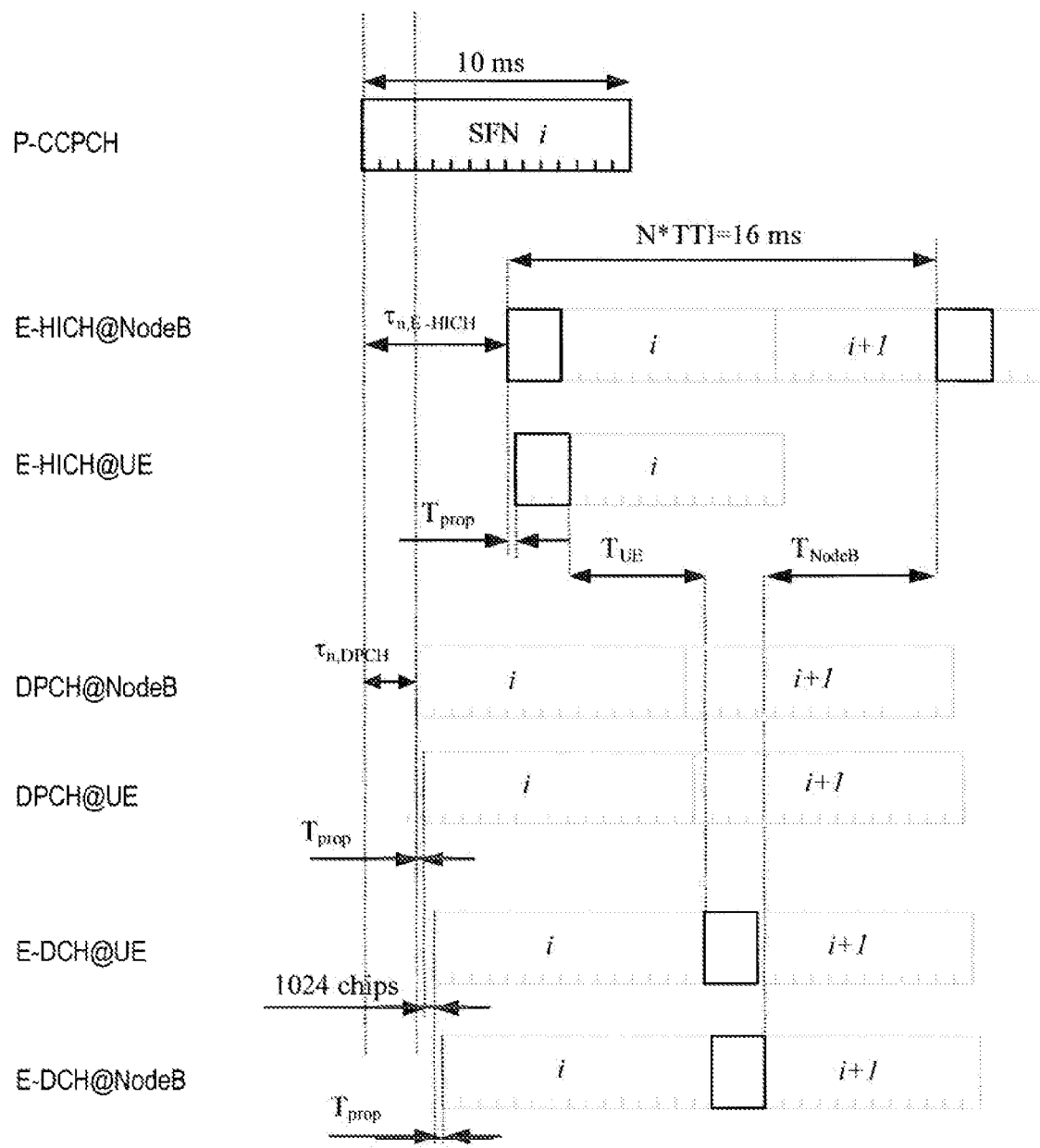
FIG. 2 shows timing requirements for prior art HSUPA signals.

In FIG. 2 below, a timing scheme for the E-DCH is shown for an exemplary 2 ms TTI interval. The timing scheme is not directly known, but can be derived from 3GPP 25.211 TS, Rel. 8 and 3GPP 25.402 TS Rel. 8.

The following notions will also appear from the above specifications and shall not be dealt with further in this document:

BFN, Base station Frame system clock, which is related to a System Frame Number, SFN, P-CCPCH, E-HICH@NodeB, E-HICH@UE DL, DPCH@NodeB DL, DPCH@UE, E-DCH@UE, E-DCH@NodeB, $T_{cell}$.

$T_{cell}$ is defined in 25.402, $T_{n,E-HICH}$ in 25.211

The following parameters related to the above notions are shown in FIG. 2:

$$N*TTI, T_{n,E-HICH}, T_{prop}, T_{n,DPCH}, T_{UE}, T_{NodeB}.$$

According to the invention, it is reckoned that from 3GPP 25.211, a Node B and UE delay. T_UE and T_NODE B, can be calculated in the following manner:

$$T_{NodeB} = N*TTI - T_{prop} - T_{HICH} - T_{UE} - TTI - T_{prop}\tau_{n,E-HICH} + T_{prop} + T_{HICH} + T_{UE} - \tau_{n,DPCH} + T_{prop} + (1024\pm148)/3840 + 10 \text{ ms} \rightarrow T_{UE} = \tau_{n,DPCH} + (1024\pm148)/3840 + 10 \text{ ms} - T_{HICH} - \tau_{n,E-HICH}$$

Definitions:

$T_{n,DPCH} = Tn \times 256$ chip, $Tn \in \{0, 1, \ldots, 149\}$. Equals Frame Offset+Chip Offset rounded to closest 256 chip boarder, ref 25.402

$$\tau_{n,E-HICH} = 5120 + 7680 \times \left\lfloor \frac{(\tau_{n,DPCH}/256) - 70}{30} \right\rfloor$$

(with 10 ms *TTI*) ref 25.211

$$\tau_{n,E-HICH} = 5120 + 7680 \times \left\lfloor \frac{(\tau_{n,DPCH}/256) + 50}{30} \right\rfloor$$

(with 2 ms *TTI*) ref 25.211.

TTI=2 or 10 ms

N=4 (10 ms TTI) or 8 (2 ms TTI), Number of HARQ processes.

N*TTI=the overall roundtrip time for the HARQ protocol $T_{UE}$=UE processing time.

$T_{Node\ B}$=Node B processing time (from last bit in to first bit out)

$T_{cell}$=a cell specific offset $T_{prop}$=propagation delay in air interface.

$T_{HICH}$=the length of E-HICH

The table below shows the delay for the UE and Node B, using the calculations above, in case of 50 and 200 km cell radius.

TABLE

| Configuration | 50 km Cell Radius 10 ms TTI | 200 km Cell Radius 10 ms TTI | 50 km Cell Radius 2 ms TTI | 200 km Cell Radius 2 ms TTI |
|---|---|---|---|---|
| # HARQ processes | 4 | 4 | 8 | 8 |
| E-DCH TTI [ms] | 10 | 10 | 2 | 2 |
| T_HICH [ms] | 8 | 8 | 2 | 2 |
| T_UE Minimum [ms] | 5.6 | 5.6 | 3.6 | 3.6 |
| T_UE Maximum [ms] | 7.6 | 7.6 | 5.6 | 5.6 |

TABLE-continued

| Configuration | 50 km Cell Radius 10 ms TTI | 200 km Cell Radius 10 ms TTI | 50 km Cell Radius 2 ms TTI | 200 km Cell Radius 2 ms TTI |
|---|---|---|---|---|
| T_Node B Minimum [ms] | 14.1 | 13.1 | 6.1 | 5.1 |
| T_Node B Maximum [ms] | 16.0 | 15.0 | 8.0 | 7.0 |

From the table above, it shows that differences may appear for the delay which can be as low as T_NODE_B MINIMUM and as high T_NODE_B_MAXIMUM. It can be concluded that the value of the chip offset affects the maximum allowed Node B processing time and the maximum allowed UE processing time.

First Embodiment of the Invention

As mentioned in the background as explained in relation with FIG. 2, there exist delay requirements that Node B and the user entities must meet in order to provide for the required HARQ responses. As shown above, the response delay requirements depend on the assigned chip offset for the user entity in question and to some extent—according to some applications—also on the location of the user entity in relation to the Node B. The further away from the base station, the less time is available for providing a response within a fixed time slot scheme which applies for the overall cell system comprising the Node B and multiple distributed user entities.

However, instead of arbitrarily choosing a chip offset which can satisfy the basic response time requirements for a cell system, the selection of a chip offset/response timing according to the invention is further selected so as to optimize e.g. computational resources in the base station.

For an EUL application, this means that when Node B has received its last bit in a E-DCH transmission, Node B must be able to process according to the currently selected receiver algorithm until the predetermined E-HICH transmit time occurs. If the RNC were to select a chip offset without any "interaction" with Node B, a limitation would occur as to which receiver algorithms that could be used. This limitation is aggravated with the complexity of the receiver.

Figure 3:
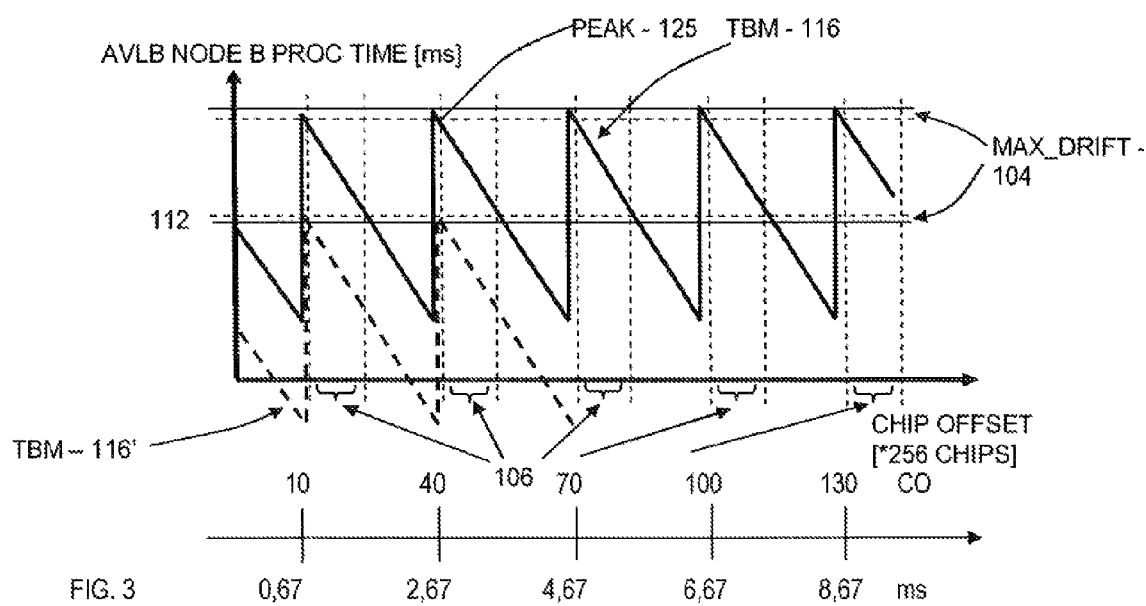
FIG. 3 shows a Node B delay as a function of the chip offset according to the invention.

FIG. 3 shows the available Node B processing time as a function of the chip offset, based on the equations above. The chip offset on the x-axis are the chip offset values in unit of 256 chips, i.e. it is the chip offset specified over Node B Application Part (NBAP), but rounded to the closest 256 chip border according to 3GPP 25.402. As mentioned earlier, the range of the chip offset is between 0 and 38144 chips, 38400 chips correspond to 10 ms. The graph which appears from FIG. 3 is referred to a as time budget map, TBM, 116.

The time budget map depends on whether a TTI of 10 ms or a TTI of 2 ms applies. Note that the UE processing time budget increases when the Node B processing time budget is decreasing. The difference between two peaks in the plots is 7680 chips or 2 ms.

Figure 1:
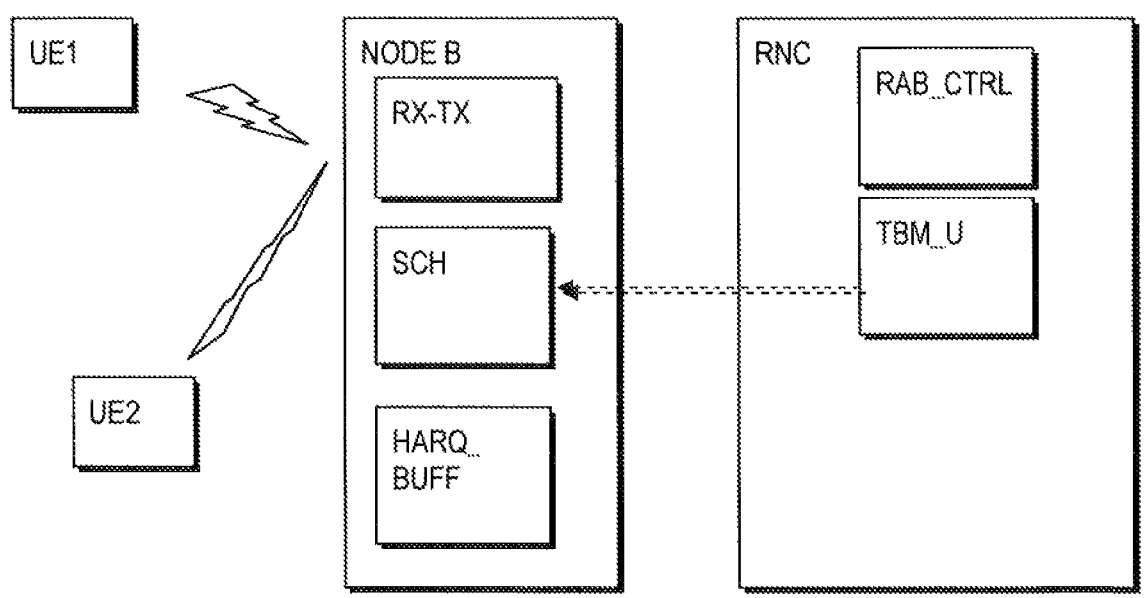
FIG. 1 Shows a radio network control apparatus according to the invention interacting with a HSUPA Node B and user entities.
Figure 5:
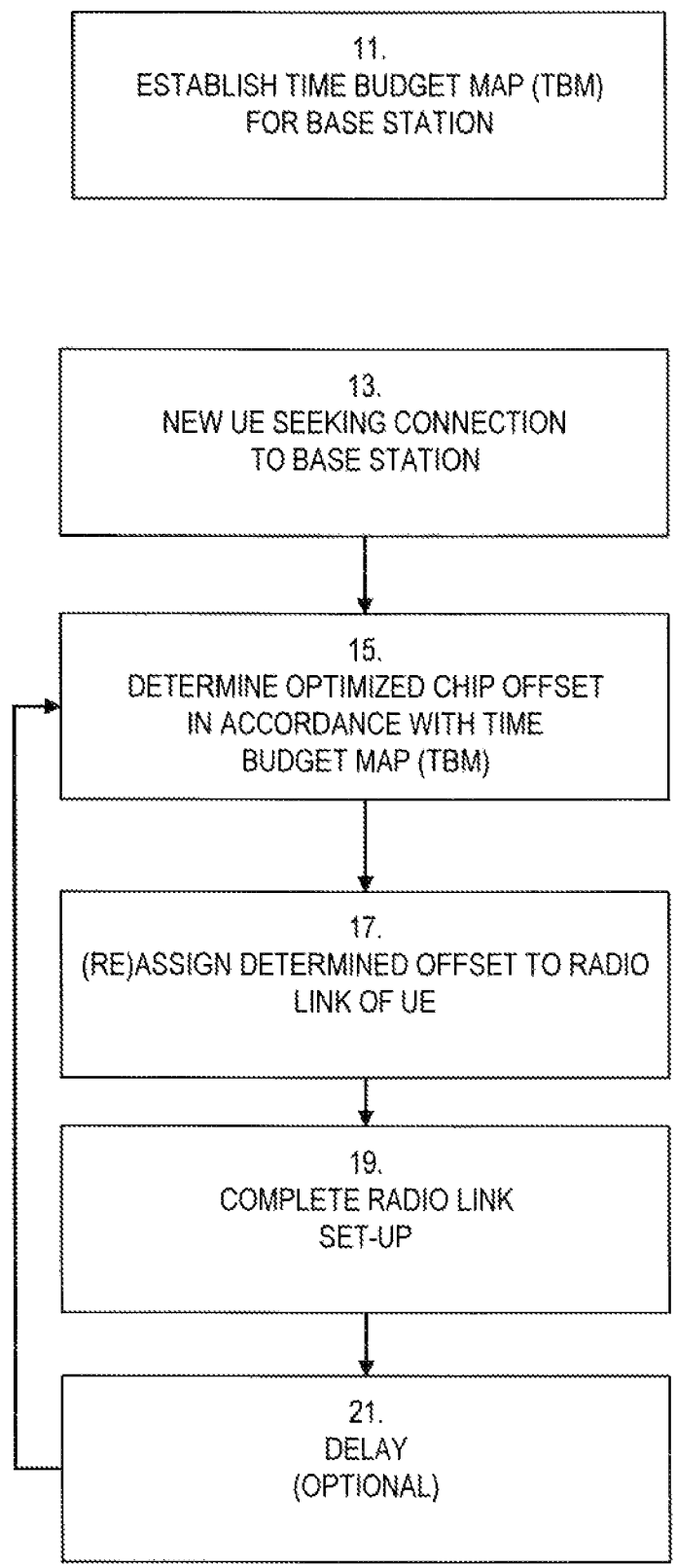
FIG. 5 shows a preferred method according to the invention.

According to one embodiment of the invention, shown in FIG. 1 and FIG. 5, there is provided a base station, Node B, communicating with various user entities, UE1 and UE2. Node B comprises a receive/transmit unit, RX-TX, a scheduler, SCH and HARQ buffers, HARQ_BUFF. The Node B communicates with a radio network control apparatus, RNC, comprising a Radio Bearer (RAB) Control unit RAB_CTRL and a transmit budget map estimation unit; TBM_U, from which Node B is assigned a chip offset allocation for respective user entities at radio link set up. The transmit budget map unit TBM_U carries out the methods shown in FIGS. 5, 5A and 5B (to be explained in the following) and is preferably implemented as a processor carrying out the methods in software.

According to one aspect of the invention, the scheduler of Node B is set to operate so as to support an allowed given minimum processing time, 112, in which the receiver in Node B is 'guaranteed time' to perform the necessary computations for decoding and processing. If this minimum time is not available, there may not be enough time to process the up-link transmission and proving the required response. Advantageously, the supported minimum processing time 112 is set sufficiently high such as to accommodate the various computational processes required, that is, set with the latter requirements in mind.

Still further and according to the invention, a time budget map 116—according to which the available base station processing time in relation to the assigned chip offset, CO, for at least one given user entity for rather location of the user entity) in the cell is given—is assessed using the calculations mentioned above. One such time budget map 116 for a first given user entity at a given location is shown in FIG. 3, wherein the UE is located 10 km from the antenna of the Node B.

For a second user entity being arranged further away from the first user entity, there exist another time budget map 116'. This latter time budget map 116' appears parallel displaced downwards in relation to the former time budget map 116.

According to a further aspect of the invention, the chip offset is determined and assigned to a given user entity so that the processing time in the Node B can be predicted (predetermined) and so that there will be enough time in the Node B for the processing in the receiver (guaranteed). Note, that the available time in the UE for processing will decrease if the response time is increased in the Node B, but that it does not matter for the UE since the minimum time the UE has to support is not changed—i.e. the requirement on the UE stays the same even though the available time in the Node B can be increased.

Figure 4:
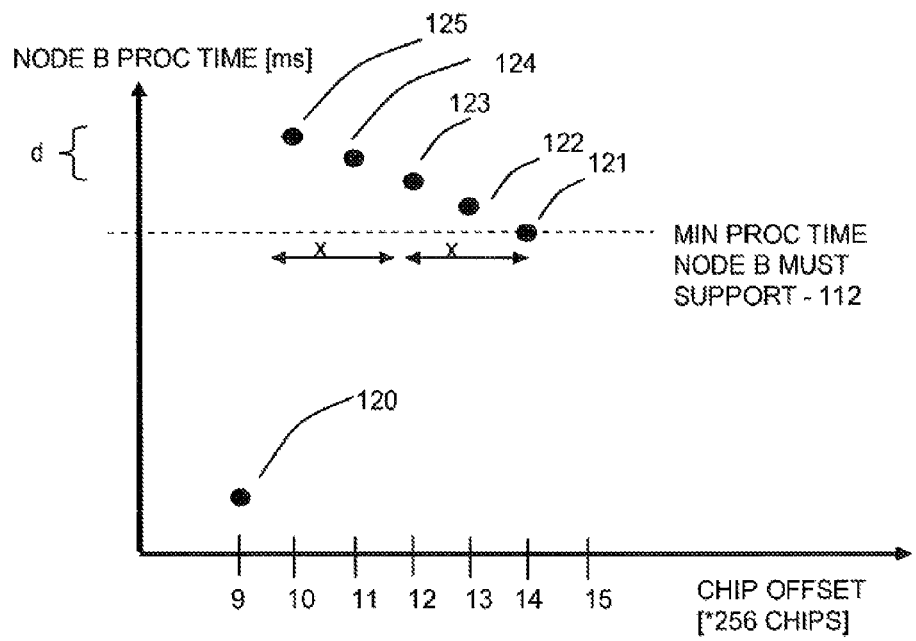
FIG. 4 shows a Node B delay as a function of chip offset according to another aspect of the invention.

FIG. 4 is a further representation of a time budget map here being represented by a number of possible points for assignment, 125-121.

According to one aspect, the following procedure, illustrated in FIG. 5, is carried out Adjusting a timing offset value, CO, —such as a chip offset value in a WCDMA system—for a radio link of a base station, Node-B, the base station being adapted to receive up-link transmissions from a user entity, UE, on the radio link according to predetermined response time requirements. The method comprising the steps of estimating, 11, at least one base station time budget map, TBM—116, 116', according to which the available processing time in the base station is given as a function of the possible timing offset value, CO;

determining, 15, a given offset value, CO—106, for the radio link, RL, of the user entity in accordance with the estimated time budget map, TBM, such as to provide an optimized offset, CO, value for the base station;

assigning or re-assigning, 17, the determined timing offset value, CO, to the radio link, and completing, 19, radio link set-up for the user entity, UE.

According to one embodiment, a generalized time budget map 116 is established in step 11 for one representative user entity. This will suffice for some applications, for instance small cells.

For instance, the step of determining the optimized chip offset, step 15, may be undertaken after a new use entity is seeking connection to a base station, step 13. Optionally, the radio link set-up may be initiated in step 13.

Optionally, a new offset value may be re-assigned—step 17—after a delay, step 21, adapting for a changed location of a user entity or for obtaining a different distribution of offsets, whereupon a re-configuration 19A, of the radio link set-up for the user entity, UE, is performed.

According to another embodiment, the time budget map is established for various distributed user entities taking into account the propagation delay.

At step 17, NBAP RL SETUP (i.e. at the initial setup for the UE) to Node B and Radio Resource Control (RRC) signalling to the UE, only the chip offset values that give the Node B the longest possible processing time are used, i.e. the values 10, 40, 70, 100 or 130 (in units of 256 chips) are used as candidates for offset assignment. These values will guarantee that the Node B will have as much time for processing as possible for each radio link.

According to a further aspect of the invention, and as illustrated in FIG. 4, a chip offset allocation—see any of alternative points 125, 124, 123, 122 and 121, providing a processing time higher than the predetermined minimum processing time 112—is chosen so that the Node B processing time is above the supported minimum processing time. For instance, the allocation corresponding peak 125 may be chosen so as to allow a maximum Node B processing time.

In one preferred embodiment, the method moreover comprises the step of optimizing the offset value, CO, step 15, involves comparing the time budget map, TBM, with a minimum supported base station processing time, 112, for the base station. The assignment, 15, of the timing offset value is optimized such that base station processing time is above the minimum supported base station processing time, 112.

Accordingly, a number of recurrent peaks, 125, and their associated timing offset values are estimated in the time budget map, TBM.

The time budget map, TBM, may constitute a generalized map which pertains to a predetermined location, or a set of locations, in a cell associated with the base station.

Alternatively, a plurality of time budget maps, 116, 116' is provided. Each respective time budget map is established for timing conditions which applies for the given user entity or given set of user entities.

According to the invention there is provided a radio network control apparatus being adapted for adjusting a timing offset value, CO, for a radio link of a base station, the base station being adapted to receive uplink transmissions from a user entity, UE, on the radio link according to predetermined response time requirements, the radio network control apparatus, RNC, comprising a transmit bit map unit, TBM_U, The transmit bit map unit is being adapted for estimating, 11, at least one base station time budget map, IBM—116, 116', according to which the available processing time in the base station is given as a function of the possible timing offset value, CO;

determining, 15, a given offset value, CO—106, for the radio link, RL, of the user entity in accordance with the estimated time budget map, TBM, such as to provide an optimized offset, CO, value for the base station; and assigning, 17, the determined timing offset value, CO, to the radio link.

It should be noted that the radio network control apparatus could be a UTRAN (UMTS (Universal Mobile Telephony System) Terrestrial Access Network, Radio Network Controller interacting with a Node B, but the radio network control apparatus could also be implemented as a part of the radio base station, such that the two entities the radio network control apparatus and the radio base station are located in the same entity (as sub entities) or in a common housing.

Second Embodiment of the Invention

According to a second embodiment of the invention, timing drift is considered.

Timing drift appears because a second radio link may be set up in another Node B, e.g. due to the user entity being in soft handover. The downlink DPCH arrival can start to differ due to the fading and drift in Node B clocks (BFN). The uplink transmission point in time can then start to drift.

From FIG. 4, it is seen that if for instance the peak value 121 is chosen and assigned and subsequently, a timing drift appears, the actual chip offset assignment may turn up at a position, e.g. point 120, which provides a lower available processing time.

Therefore, typically advantageous for larger cells, it is estimated how much drift that is supported, e.g. how many "chips" can the timing "frame offset"+"chip offset" be reconfigured without the processing time falls below the minimum supported processing time 112. From FIG. 4, the supported timing drift 2× can be defined as the chip offset value providing the supported minimum processing time minus the chip offset value associated with the peak 125. Typically, only a few steps are needed to avoid getting to close to the peak 125, since 1 step (in unit 256 chips) corresponds to a distance of 10'000 m (round trip). Hence according to the second embodiment under step, an initial chip offset allocation 123 is chosen situated x chip offsets values from the point 121, where the minimum supported processing time 112 is found and x values of chip offset from the peak 125.

In other words, an initial chip offset allocation, 123, is chosen situated substantially a predetermined number offsets values x from the point, 121, where the minimum supported processing time, 112, is found and substantially a predetermined number of offset values x from the peak, 125. In other words, an offset value is chosen substantially centred between a position where the peak is found and a position where the minimum supported processing time is found.

At NBAP RL SETUP (i.e. at the initial setup for the UE) to Node B and RRC signalling to the UE, only the chip offset values that substantially guarantee the Node B the longest possible processing time with regard to possible timing drift, i.e. the values 10+x (corresponding to peak 125+x), 40+x, 70+x, 100+x or 130+x (in units of 256 chips, where x=max_drift_in_one_direction) are used for assignment. These values will with high likelihood avoid that the processing time for Node B due to timing drift will fall below the minimum supported processing time 112.

Another possibility is to select the timing offset value is such that base station processing time is chosen such as to be arranged at a first given distance (e.g. a distance corresponding to points 125 and 124 in FIG. 4) from a given upper limit corresponding to the peaks, 125, of the time budget map, TEN, of the radio link, so as to accommodate for a possible timing drift. In other words, the assignment of the timing offset value is performed such that base station processing time is chosen such as to be arranged not further away that a first given distance (d) from a given upper limit (UL) corresponding to the peaks of the time budget map (TBM) of the radio link, so as to accommodate for a possible timing drift.

In an implementation for the enhanced uplink. the radio network control apparatus is being adapted for adjusting the timing offset value, CO, for a radio link of a base station, Node-B, the base station being adapted to receive uplink transmissions from a user entity, UE, on the radio link according to predetermined response time requirements. The radio network control apparatus, RNC, comprises a time budget map unit, TBM_U, and is being adapted for carrying out the method shown in FIG. 5.

Further Embodiments

Figure 5A:
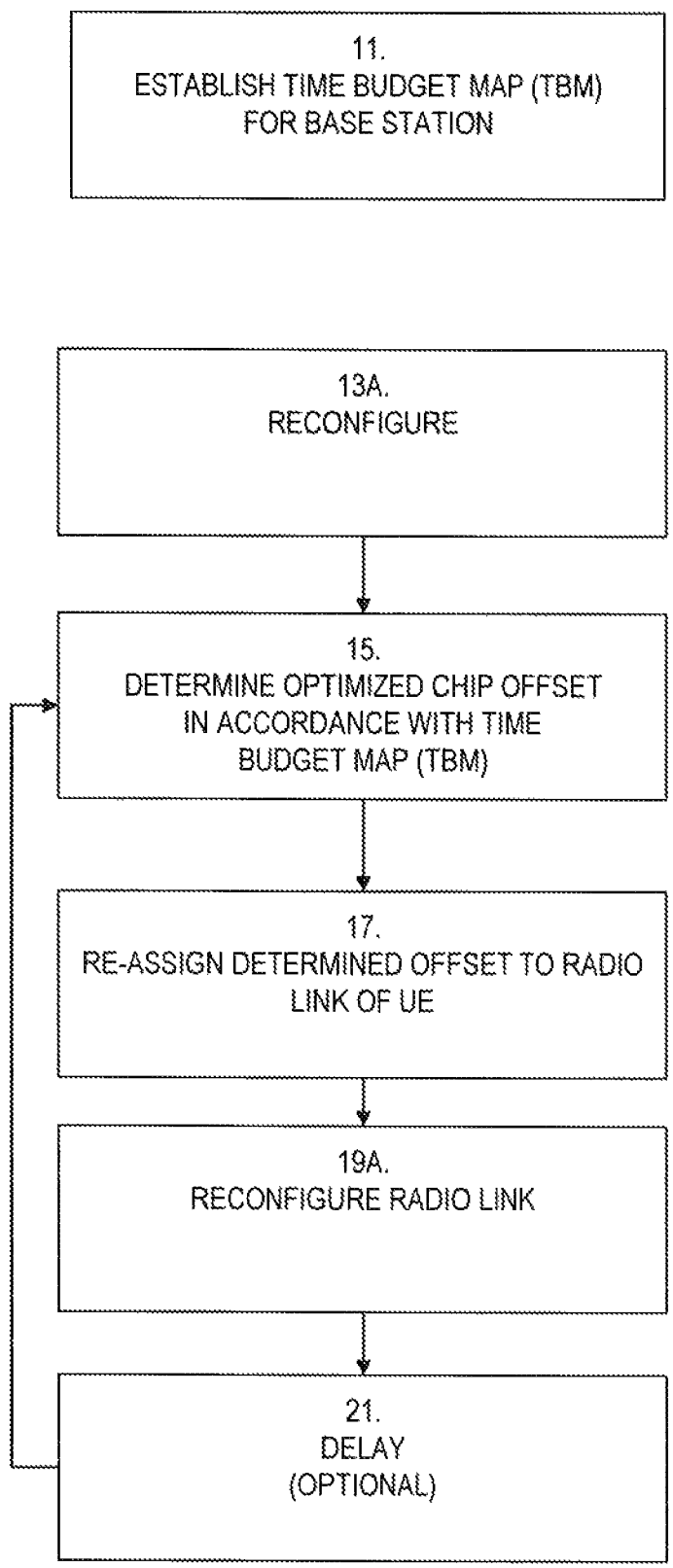
FIG. 5A shows a second embodiment according to the invention.

In FIG. 5A a further embodiment of the invention is shown. In this embodiment, a radio link may already have been set up for the user entity. In step 13A, a reconfigure action is triggering steps 15-17, and 21, which are the same as explained under FIG. 5. In step 19A, a reconfiguration of the existing radio link is performed. Under the reconfiguration, the optimized offset value, such as the optimized chip offset in accordance with the established time budget map determined under step 17, is used.

In parallel with this procedure, or before it, the establishing 11 of the time budget map for the base station for the given user entity is carried out, such that the determination of the optimized chip offset can be performed on an update time budget map in step 15.

Figure 5B:
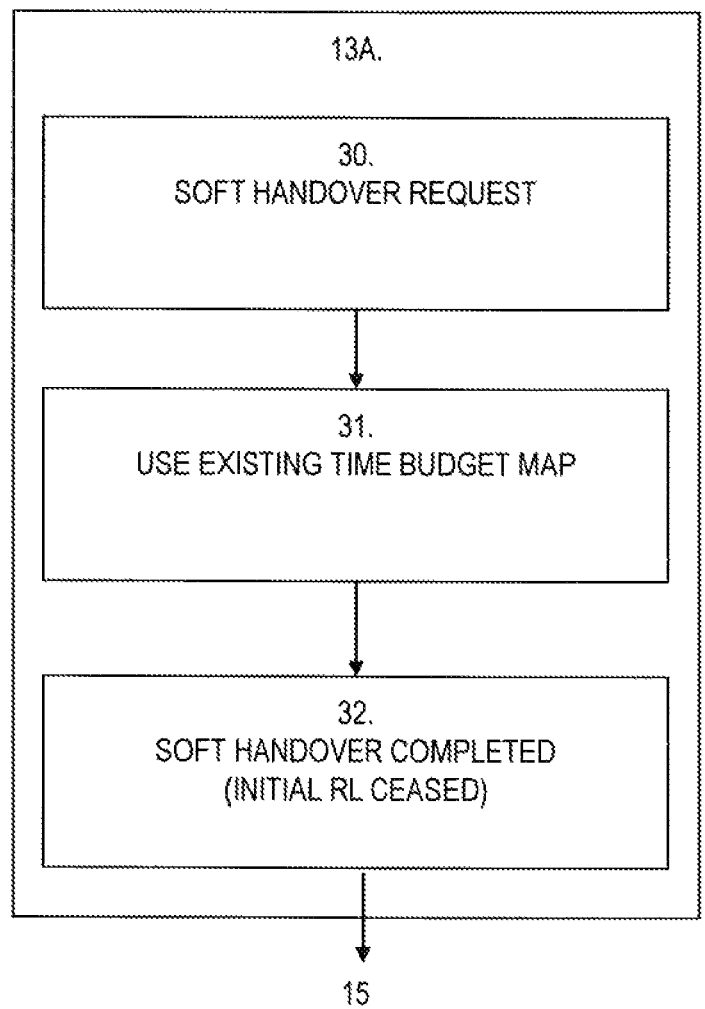
FIG. 5B shows optional steps undertaken in the second embodiment.

FIG. 5B shows a further option of step 13A of FIG. 5. Here, one possible cause for triggering the re-configuration step 13A in FIG. 5A, could be a request for soft handover from a first cell—according to which an optimized timing offset value is already established and which is used on a given radio link for a user entity—to a second new cell. After the soft handover request, 30, concerning the user entity, the existing established timing offset value according to the initial time budget map is used, 31. Upon the soft handover being completed, 32, i.e. after the initial radio link of the first cell has ceased, the process proceeds to step 15 in FIG. 5A, whereupon a new optimized timing offset value is determined according to an established time budget map being established for the base station to which the handover was made.

According to a further embodiment of the invention, the actual assignment of offset to an individual user entity on the E-DCH and on the Dedicated Channel (DCH) is performed such that for each new user entity, the actual chip offset is assigned such that the distribution of the offsets for all the user entities are spread evenly. This is done in step 17 of FIG. 5, wherein a number of viable candidate chip offsets 106, providing points 121-125 as appears from FIG. 4, are considered. According to this further embodiment, in step 17 of the method shown in FIG. 5, the chip offset for each new user entity is further arranged such that a substantially even distribution over time is accomplished having regard to previously assigned user entities in a cell associated with the base station. Preferably, the even spread of offsets for all user entities are such that the base station processing time is above the minimum supported base station processing time, 112.

Figure 6:
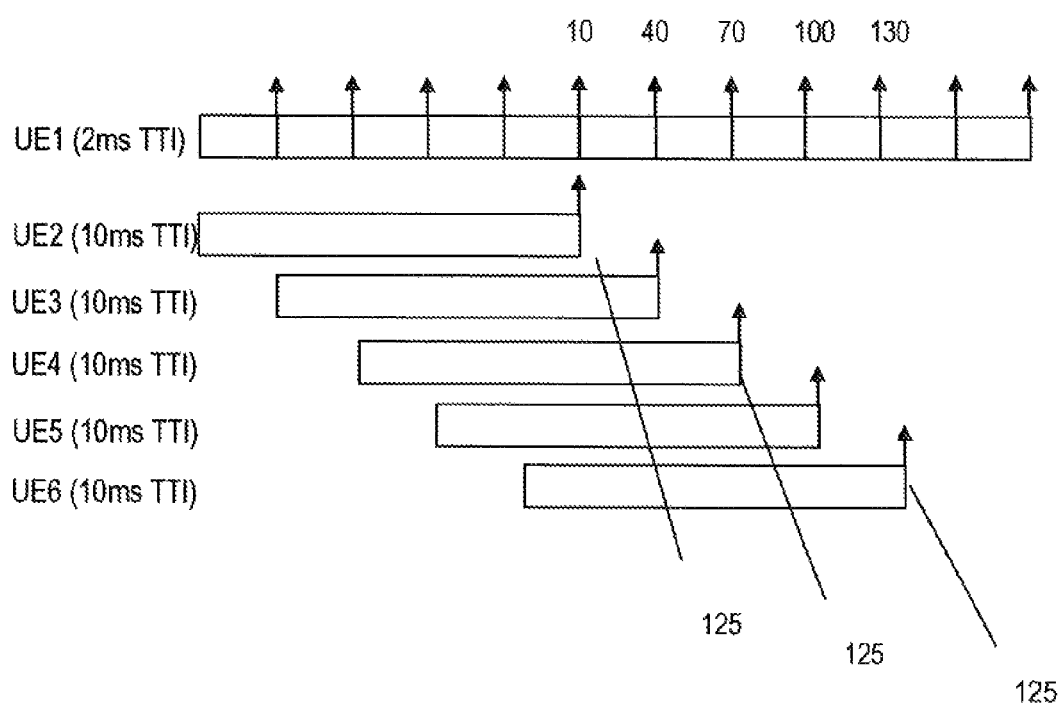
FIG. 6 shows a still further embodiment of the invention.

Such an exemplary distribution has been show in FIG. 6, where first radio link appears from a 2 ms TTI interval and five radio links are provided for 10 ms intervals. The latter five 10 ms TTI radio links are skewed in time with different starting points, at exemplary 2 ms delays in relation to one another. The timing of each radio link could for instance correspond to the point 125 as shown in FIG. 4. See also FIG. 6, where the arrows indicate when the transmissions have been received in the Node B.

The spreading could also be performed over a wider time base, such as over different chip offsets of say 10, 20, 40, 80 ms TTI, as the chip offset—as mentioned above—has a range from 0 to 38144 chips (i.e. from 0 to 9.9333 ms). The chip offset allocation between different E-DCH with 10 ms TTI shall be spread evenly, with multiple 2 ms separation. This is also valid for DCH with a TTI of 10, 20, 40 or 80 ms.

The spreading will prevent the Node B from experiencing extreme peaks in the processing, as opposed to a simultaneous offset assignment where all UEs shall be demodulated and decoded simultaneously.

ABBREVIATIONS

3G Third Generation
3GPP Third Generation Partnership Project
ACK Acknowledgement
DCH Dedicated Channel
E-DCH Enhanced Dedicated Channel
EUL Enhanced Liplink, also called High Speed Uplink Packet Access HSUPA)
GRAKE Generalized Rake Receiver
HARQ Hybrid Automatic Repeat Request
NACK Negative Acknowledgement
NBAP Node B Application Part, i.e. the signalling protocol responsible for the control of the Node B by the RNC
RNC Radio Network Controller
RRC Radio Resource Control
TTI Time Transmission Interval
UE User Entity
UL Uplink
WCDMA Wideband Code Division Multiple Access

The invention claimed is:

1. A method for adjusting a timing offset value for a base station, the base station being adapted for controlling and receiving uplink radio link transmissions from a plurality of user entities (UE) according to predetermined response time requirements,
the method comprising the steps of:
estimating at least one time budget map according to which the available processing time in the base station is given as a function of the possible timing offset value;
determining a given timing offset value for the uplink radio link of a user entity from the plurality of user entities in accordance with the estimated time budget map; and
assigning the determined timing offset value to the radio link,
wherein the assignment of the timing offset value is optimized such that a base station processing time is above a minimum supported base station processing time, and wherein the timing offset for each new user entity is further arranged such that a substantially even distribution over time is accomplished considering previously assigned user entities in a cell associated with the base station.

2. The method according to claim 1, wherein a number of recurrent peaks and their associated timing offset values are estimated in the time budget map.

3. The method according to claim 1, the optimizing the offset value includes comparing the time budget map with a minimum supported base station processing time for the base station.

4. The method according to claim 1, wherein the time budget map comprises a generalized map which pertains to a predetermined location, or a set of locations, in a cell associated with the base station.

5. The method according to claim 1, wherein a plurality of time budget maps are estimated and wherein each respective time budget map is established for timing conditions which apply for a given user entity or given set of user entities.

6. The method according to claim 1, wherein a radio network control node is interacting with the radio base station and wherein the timing offset value is controlled by the radio network control node.

7. The method according to claim 1, wherein the assignment of the timing offset value is performed such that base station processing time is not greater than a first pre-determined distance from an upper limit corresponding to the peaks of the time budget map of the radio link.

8. The method according to claim 1, wherein an initial timing offset allocation is chosen substantially centred between a position in the time budget map where a peak is found and a position where a minimum supported processing time is found.

9. The method according to claim 1, wherein the timing offsets of the radio links are skewed in time with different starting points in relation to one another.

10. The method according to claim 1, wherein a new offset value is reassigned after a delay adapting for a changed location of a user entity or for obtaining a different distribution of offsets.

11. The method according to claim 1, further comprising the step of:
determining a given offset value for the radio link of the user entity accordance with the estimated time budget map;
wherein the determining step is performed upon at least one of a user entity is seeking connection with a base station and by a reconfiguring action.

12. The method according to claim 1, wherein the timing offset is a chip offset.

13. The method according to claim 1, wherein the determining of a given timing offset value for the radio link of the user entity in accordance with the estimated time budget map is performed upon a user entity seeking connection with the base station.

14. The method according to claim 1, wherein communication between the base station and user entity is based on a common timing scheme between the base station and at least the user entity, the timing offset value defining in relation to a time reference when the user entity can transmit on the uplink radio link, the timing offset value being defined for each user entity from the plurality of user entities.

15. The method according to claim 1, wherein the timing offset provides a time reference when a user entity is permitted to transmit on an uplink radio link.

16. The method according to claim 1, wherein the assignment of the timing offset value is optimized such that a base station processing time is above a minimum supported base station processing time.

17. A radio network control apparatus being adapted for adjusting a timing offset value for a radio link of a base station, the base station being adapted to receive uplink transmissions from a plurality of user entities, on the radio link according to predetermined response time requirements, the radio network control apparatus comprising:
a memory;
a processor coupled to the memory; and
a transmit bit map unit implemented by the processor executing instructions stored in the memory to:
estimate at least one base station time budget map according to which the available processing time in the base station is given as a function of the possible timing offset value;
determine a given offset value for the uplink radio link of a user entity from a plurality of user entities in accordance with the estimated time budget map; and
assign the determined timing offset value to the radio link,
wherein the assignment of the timing offset value is optimized such that a base station processing time is above a minimum supported base station processing time, and wherein the timing offset for each new user entity is further arranged such that a substantially even distribution over time is accomplished considering previously assigned user entities in a cell associated with the base station.

18. The radio network apparatus according to claim 17, further comprising a radio bearer control unit adapted to perform Node B application protocol signalling with a Node B.

19. The radio network apparatus according to claim 17, the timing bit map unit further configured to:
upon the user entity seeking connection with the base station, initiate radio link set-up for the user entity;
assign the determined timing offset value to the radio link; and
complete radio link set-up for the user entity.

20. The radio network apparatus according to claim 17, wherein the base station corresponds to Node B and the uplink corresponds to an Enhanced Up Link, and wherein the timing offset value is a chip offset associated with timing requirements for the Enhanced Dedicated channel at Node B.

21. The radio network apparatus according to claim 17, wherein the determination of a given offset value for the radio link of the user entity in accordance with the estimated time budget map, is made
upon a user entity seeking connection with the base station.

* * * * *

UNITED STATES PATENT AND TRADEMARK OFFICE
CERTIFICATE OF CORRECTION

PATENT NO. : 9,107,156 B2   Page 1 of 1
APPLICATION NO. : 13/516866
DATED : August 11, 2015
INVENTOR(S) : Folkstedt et al.

It is certified that error appears in the above-identified patent and that said Letters Patent is hereby corrected as shown below:

Title Page, Item (57), under "ABSTRACT", in Column 2, Line 3, delete "Sink" and insert -- link --, therefor.

Title Page, Item (57), under "ABSTRACT", in Column 2, Line 10, delete "fink" and insert -- link --, therefor.

In the Specification

In Column 1, Line 62, delete "as signing" and insert -- assigning --, therefor.

In Column 2, Line 20, delete "when" and insert -- when, --, therefor.

In Column 4, Line 22, delete "delay." and insert -- delay, --, therefor.

In Column 6, Line 9, delete "'guaranteed time'" and insert -- "guaranteed time" --, therefor.

In Column 6, Line 21, delete "for" and insert -- (or --, therefor.

In Column 6, Line 46, delete "out" and insert -- out: --, therefor.

In Column 7, Line 55, delete "IBM-" and insert -- TBM- --, therefor.

In Column 8, Line 58, delete "TEN," and insert -- TBM, --, therefor.

In Column 8, Line 65, delete "uplink." and insert -- uplink, --, therefor.

In Column 9, Line 2, delete "entity." and insert -- entity, --, therefor.

In Column 10, Line 15, delete "Liplink," and insert -- Uplink, --, therefor.

In Column 10, Line 16, delete "HSUPA)" and insert -- (HSUPA) --, therefor.

Signed and Sealed this
Twenty-eighth Day of June, 2016

Michelle K. Lee
*Director of the United States Patent and Trademark Office*